(Model.)
A. CAMPBELL.
PLUMBER'S TRAP.
No. 246,719.                Patented Sept. 6, 1881.
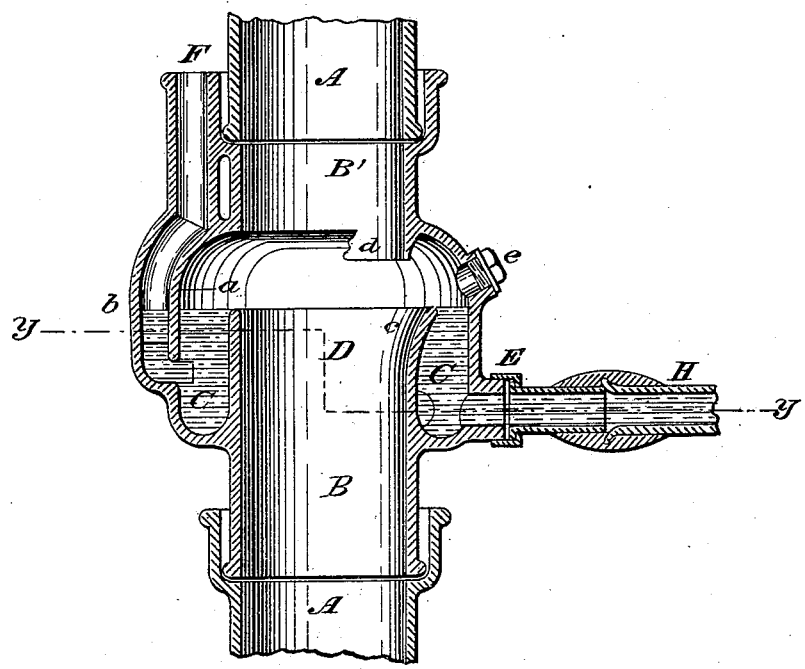
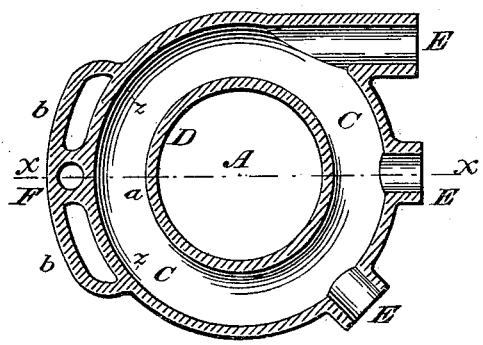
ATTEST:
E. K. Bolton
Geo. Bainton
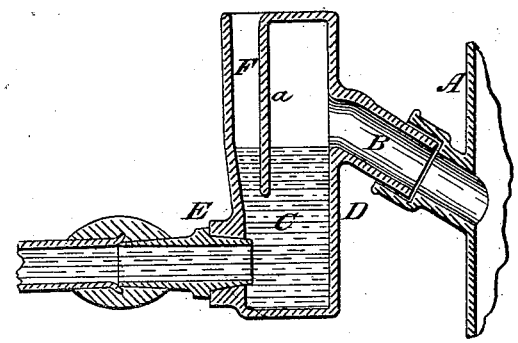
INVENTOR:
Andrew Campbell
by his Attys.
Burke, Fraser & Connett.

UNITED STATES PATENT OFFICE.

ANDREW CAMPBELL, OF BROOKLYN, ASSIGNOR TO PAUL P. TODD, OF NEW YORK, N. Y.

PLUMBER'S TRAP.

SPECIFICATION forming part of Letters Patent No. 246,719, dated September 6, 1881.

Application filed January 14, 1881. (Model.)

*To all whom it may concern:*

Be it known that I, ANDREW CAMPBELL, a citizen of the United States, residing at Brooklyn, Kings county, New York, have invented certain Improvements in Plumbers' Traps and means for flushing said traps and the waste-pipes connected therewith, of which the following is a specification.

My invention relates to traps arranged in the waste-pipe which leads from the service-cock to the sewer, the object being to prevent said traps from being emptied by "siphoning," so called, and the gas and foul air from the pipes and sewer being thus permitted to enter the building at the bowls, sinks, &c., all as will be more particularly hereinafter referred to.

My trap involves two forms or modifications, both of which operate upon the same general principle; but one is best adapted to new plumbing and the other to the improvement of the plumbing already existing in houses.

I will now describe the first form with reference to the first two figures of the drawings, in which—

Figure 1 is a vertical mid-section through my trap and portions of the main waste-pipe and a waste-pipe leading from a bowl or lavatory to the trap. The section is taken in the plane of the line $x$ $x$ in Fig. 2. Fig. 2 is a horizontal section of the trap, taken in the plane of the line $y$ $y$ in Fig. 1.

Before proceeding to describe my invention in detail, I will say that the method I employ to prevent the trap from being emptied by siphoning consists in the arrangement of a sealed air-inlet in the trap, whereat air will enter before the water in the trap falls to a level with the inlet from the bowl, and thus destroy the vacuum. The remaining water in the trap will then fall back and again seal the air-pipe.

Let A A represent portions of the main waste-pipe, into which my trap is shown as inserted.

B B' are the connecting portions or necks of the trap, which may be joined onto the pipes A A in any good way.

C is an annular basin, arranged, by preference, to extend entirely around the part B, so as to leave an overflow-lip, D, this latter being simply a continuation upward of B. The walls of the basin serve to connect the parts B B'.

E E are the waste-inlets from the bowls or sinks, which may tap the annular basin C radially or tangentially, both arrangements being shown. If arranged tangentially, which is the preferred form, the currents through the inlets tend to sweep around the basin and wash it out, thus preventing the collection of sediment to a considerable extent.

F is the air-inlet before mentioned, the upper end of which is open to the atmosphere, while the lower end dips into and is sealed by the water in the trap. I prefer that the inlet shall be a simple cylindrical tube, as shown; but I arrange this to open into the trap behind an extended sealing-lip or partition, $a$, which extends across the basin of the trap from $z$ to $z$ in Fig. 2. This partition is arranged to extend across and part off a swell or enlargement, $b$, on the side of the trap. By this arrangement, when the water in the trap falls below the lower edge of the lip $a$, a large area for the ingress of air is immediately opened, whereas if a cylindrical tube or pipe only be employed, as it may be, the water must fall below its lower end a distance equal to one-fourth of its internal diameter to insure a free entrance of air equal to the full capacity of the tube or pipe.

In Fig. 1 I have shown the overflow-lip D and the part B' constructed somewhat differently on the right side from what they are on the left. This is intended to show that they may be made in either way. When a water-closet is connected with the main pipe A above the trap, I prefer to flare the lip D outward at the top, as at $c$, (on the right in Fig. 1,) and also to extend the part B down into the cavity of the trap, as at $d$. This construction prevents any of the soil from the closet from getting into the trap, as will be readily understood; and I prefer this form. For use where no closets are employed the construction shown to the left in Fig. 1 will serve.

The operation is as follows: When the main pipe A is filled with a descending column of water this column exhausts the air from trap or pipe above, and after it the water from the trap; but before all of the water passes out of the trap the air pressing in at the inlet F forces its way under the lip $a$ into the cavity of the trap and destroys the vacuum. The pressure now being equalized, the water in the trap, which had stood before at a level higher than the lower edge of the lip a, will now settle back, immerse the edge of said lip, and seal the air-inlet. As the lower edge of the lip a is above the inlets E, it follows that the vacuum will be broken before they are unsealed by the escape of the water from the trap.

The basin C need not, of necessity, extend entirely around the part B; but I prefer to construct it so. The enlargement b and the lip a might also be omitted and a plain tube arranged to dip into the water in the trap be employed as an air-inlet.

A screw-plug, e, may be employed to close an opening through which the interior of the trap can be reached for cleaning.

With a trap of this kind, common to all the bowls or sinks, no traps will be required in the pipes leading from the bowls or sinks to the main waste-pipe. In the remaining figure of the drawings, however, I have shown the trap arranged in the pipe leading from a bowl to the main waste-pipe, and connected to the latter by an ordinary Y-coupling.

Fig. 3 is a vertical mid-section of a trap of a modified form, together with a portion of a waste-pipe from a bowl or sink and the main waste-pipe. This trap is, in principle, the same as that just described, B representing the connection with the main waste-pipe, C the basin of the trap, D the overflow-lip, E the inlet from the bowl, F the air-inlet, and a the sealed lip of the said inlet. Its operation is precisely the same as that shown in Figs. 1 and 2.

I prefer to arrange the waste-pipe H to stand full of water, as shown, so that the water in it may act as an additional obstruction to the entrance of gases from the main waste-pipe, and also to act as a solvent for potash, lye, or other strong alkali, which can be introduced at the bowl. This solution may be allowed to remain in the pipe for some hours, and then water under full head from the main be admitted to flush and clean the pipe. This serves to free the pipe from all accumulations of greasy and soapy matter which foul it.

The construction of my trap, as shown in Figs. 1 and 2, enables me to retain the water in it up to the top or margin of the lip D, wherewith to mix a solvent—as potash, for example—for the purpose of removing the deposits which line the waste-pipes.

The combined areas of the waste-inlets E should be less than the space or available opening between the overflow-lip D and the part B, so that under no circumstances can the latter space be choked by the incoming waste water.

I am aware that running traps for sewers have been provided with air pipes or openings to prevent the gas from the sewer from getting into the house; and I am also aware that stench and gully traps have also been provided with openings for a like purpose, said openings also serving as inlets for surface-water. None of these, however, possess the peculiar characteristics of my trap, in which the waste-pipe enters the shell of the trap below the level of the water in the same, whereby the waste-pipe is retained full of water as a further protection against the entry of gas, and to serve as a solvent for alkali with which to cleanse the pipes and trap, as hereinbefore stated.

I am also aware that sewer and gully traps have been arranged to receive waste water or sewage through two or more pipes; but I am not aware that a trap has ever before been arranged in the main vertical waste-pipe of a building and adapted to receive the waste water from a number of bowls and sinks, as herein shown.

Having thus described my invention, I claim—

1. A trap for waste-pipes, having an air-inlet opening into the trap below the overflow-lip of the trap and above the waste-inlet from the bowl or sink, and the waste-inlet arranged below the normal level of the water in the trap, whereby the waste-pipe is kept full of water, substantially as set forth.

2. A trap for waste-pipes, arranged in the vertical main waste-pipe of a building, and provided with inlets to receive the waste water from the various bowls and sinks, whereby it serves as a trap common to all said bowls and sinks, said inlets being arranged below the normal level of the water in the trap, and said trap having an air-inlet opening into the trap below the overflow-lip of the same and above the waste-inlets, substantially as and for the purposes set forth.

3. A trap for waste-pipes, arranged in the main waste-pipe as an annular basin around the tubular overflow-lip, and provided with an inlet-opening for the waste water arranged tangentially, or substantially at right angles to its radius, as and for the purposes set forth.

4. A trap for waste-pipes, consisting of the connecting parts or necks B B', the annular basin C, its walls serving to connect the parts B B', the tubular overflow-lip D, the waste-water inlets E, and the air-inlet F, all arranged substantially as and for the purposes set forth.

5. The trap provided with the air-inlet F, the enlargement b, and the extended lip a, all arranged substantially as and for the purposes set forth.

6. The trap in the main waste-pipe, provided with an annular bowl arranged around a tubular overflow-lip, and the said tubular lip flared, so as to insure its catching anything that may fall from above and prevent such falling matter from getting into the bowl of the trap, substantially as set forth.

In witness whereof I have hereunto signed my name in the presence of two subscribing witnesses.

ANDREW CAMPBELL.

Witnesses:
HENRY CONNETT,
ARTHUR C. FRASER.